P. H. THOMAS.
SYSTEM OF ELECTRICAL DISTRIBUTION.
APPLICATION FILED FEB. 3, 1913.

1,211,380.

Patented Jan. 2, 1917.

2 SHEETS—SHEET 1.

WITNESSES

INVENTOR

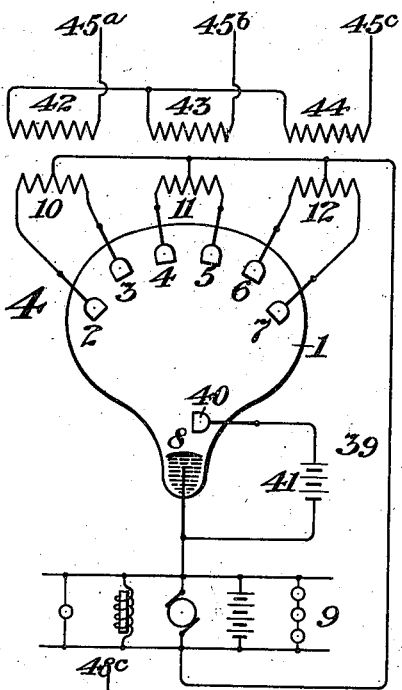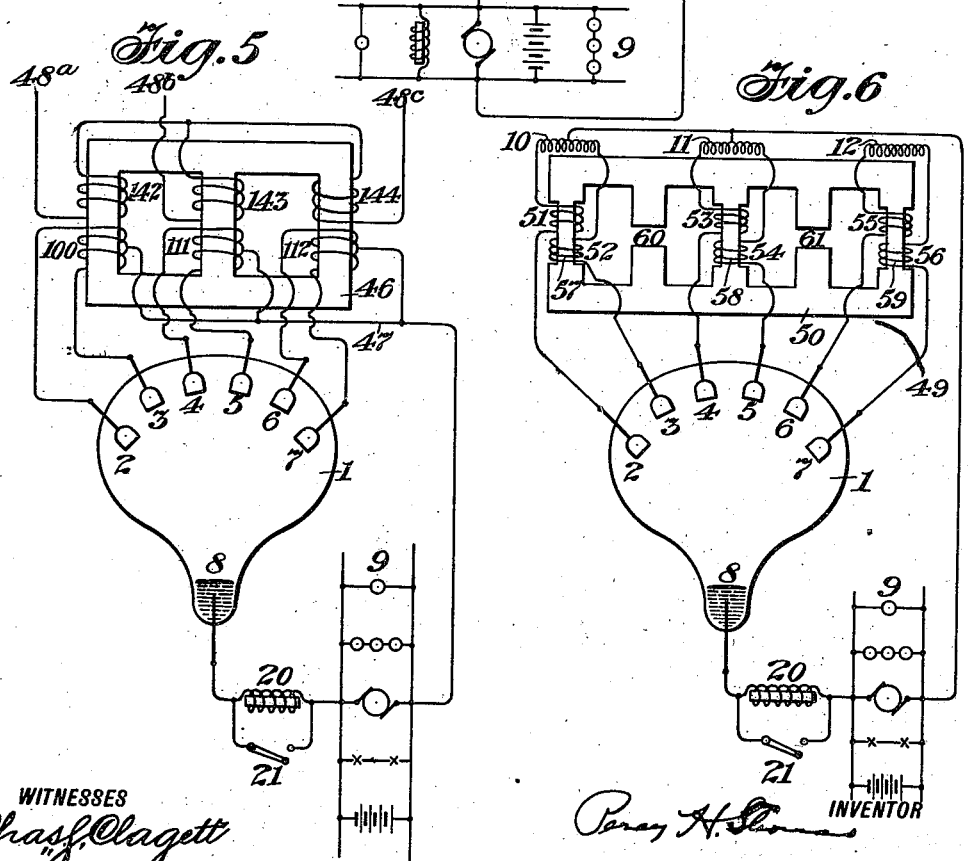

UNITED STATES PATENT OFFICE.

PERCY H. THOMAS, OF UPPER MONTCLAIR, NEW JERSEY, ASSIGNOR TO COOPER HEWITT ELECTRIC COMPANY, OF HOBOKEN, NEW JERSEY, A CORPORATION OF NEW JERSEY.

SYSTEM OF ELECTRICAL DISTRIBUTION.

1,211,380.   Specification of Letters Patent.   Patented Jan. 2, 1917.

Application filed February 3, 1913. Serial No. 745,786.

*To all whom it may concern:*

Be it known that I, PERCY H. THOMAS, a citizen of the United States, and resident of Upper Montclair, county of Essex, State of New Jersey, have invented certain new and useful Improvements in Systems of Electrical Distribution, of which the following is a specification.

My invention relates to circuits for operating mercury vapor rectifiers from multiphase alternating supply circuits and also certain particular features of the systems shown herein.

The economy in the transmission of energy of multi-phase systems offers advantages at least partly predicated upon the symmetrical flow of current therein. It is well known that when one phase only of a multi-phase supply is used, that this ordinarily does not produce such a symmetrical flow of current and, to a greater or less extent, sacrifices certain of the advantages expected in general of the multi-phase supply. The use of a mercury vapor rectifier, of the type characterized by an exhausted container and a vaporizable reconstructing cathode therein, when utilizing only one or two main anodes, tends to introduce an unsymmetrical loading on a multi-phase supply system, such, for example, as a three phase supply, and to this extent interferes with the best results obtainable in general from a symmetrically loaded three phase source.

It is one of the purposes of the present invention to point out systems, circuits and forms of rectifiers adapted to better this condition of inefficiency.

Figure 1:
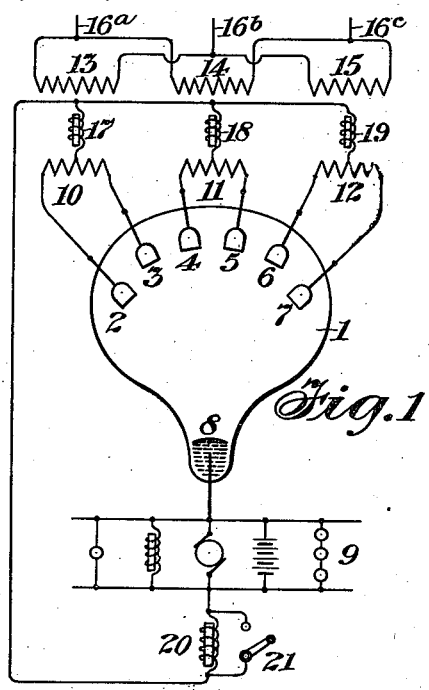
Figure 2:
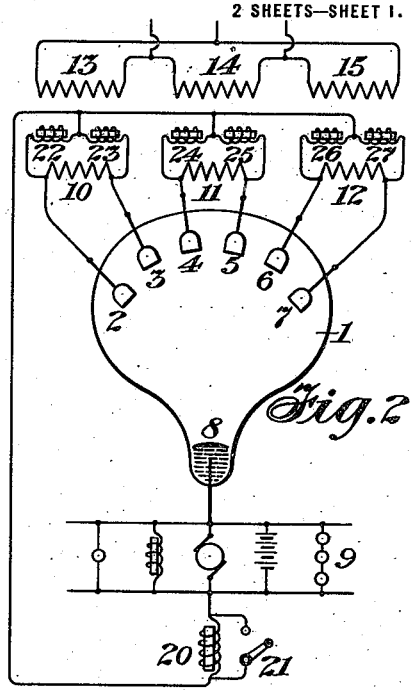
Figure 3:
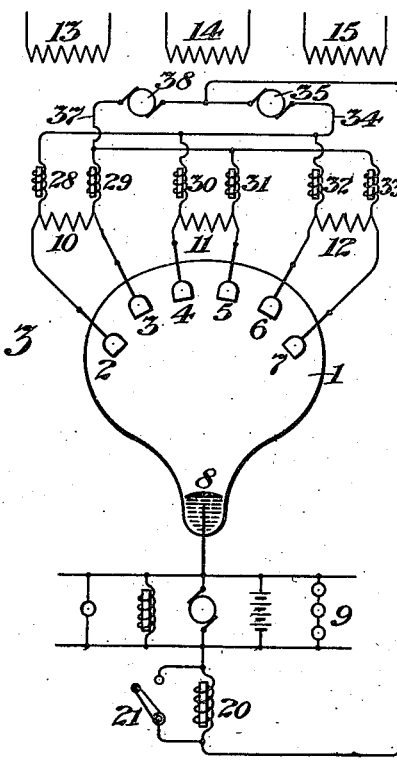

In the present drawings, in which Figure 1 shows a system supplying a vapor rectifier through three phase transformers with three D. C. inductances; Fig. 2 shows a similar system having six inductances; Fig. 3 a modification of Fig. 2; Fig. 4 a somewhat similar system with star connected transformer primaries; Fig. 5 a three phase transformer supplying a circuit something like that of Fig. 4, and Fig. 6 a six phase supply with a balance device, I have shown three phase supply circuits as typical of poly-phase circuits, but I wish it understood that my invention is broad enough to cover other poly-phase systems.

Considering more particularly the first figure, 1 is a vapor rectifier having anodes 2, 3, 4, 5, 6, 7 and a cathode 8. 9 is a work circuit containing various translating devices and 10, 11 and 12 are three transformer secondary windings whose primaries are shown respectively at 13, 14 and 15. The three primary windings are connected in delta across the three phase mains $16^a$, $16^b$ and $16^c$. The middle points of the secondaries 10, 11 and 12 respectively are connected through three inductance coils 17, 18 and 19 with the negative side of the work circuit 9. In this latter connection I may introduce an induction, 20, and provide a switch 21 by which the coil may be short circuited when desired. The rectifier, 1, may be started in any of the well known ways adapted to such apparatus and the device instead of being as shown may be made in a great variety of forms as, for example, in the form shown in my co-pending application Serial Number 745,787, filed February 3rd, 1913. The operation of this system may be described as follows: The transformer secondary, 10, with the inductance, 17, together with the electrodes 2, 3 and 8 constitutes, in effect, a single phase rectifier supplied from the primary, 13, which in turn is fed from the mains $16^a$ and $16^b$. This single phase rectifier is capable of supporting current continuously regardless of any of the other transformer windings or electrodes and will call for substantially normal single phase currents from the mains $16^a$ and $16^b$. In this case the inductance, 17, is made to have the well known keeping alive function. It may or may not be assisted by the inductance, 20. Similarly, the transformer secondary, 11, the anodes, 4 and 5, and the cathode, 8, together with the inductance coil, 18, constitute a second single phase rectifier fed from the primary winding, 14, which in turn is supplied from the mains $16^a$ and $16^c$. This second elemental rectifier is by itself capable of sustaining continuous current flow and serves to produce a substantially regular single phase current in the mains $16^a$ and $16^c$. Similarly with the elemental rectifier constituted by the secondary winding 12, the inductance 19, the electrodes 6, 7 and 8. This third elemental rectifier similarly causes single phase currents in the mains $16^b$ and $16^c$. Thus the net result is to produce a symmetrical relatively normal flow of current in the three phase mains, giving the ordinary advantages of three phase generation and transmission. Were, however, the inductances 17, 18 and 19 omitted and reliance placed upon some such inductance as the coils 20, current would flow from but one anode at a time,—that anode having for the moment the highest potential,—so that current would flow in but one of the three transformers at any one time with the result that relatively unbalanced and intermittent current would flow in the three phase supply mains 16ª, 16ᵇ, 16ᶜ, and cause a resultant loss in efficiency and effectiveness as will be evident. Thus, by the insertion of the inductances 17, 18 and 19 and the delta connection of the transformer primaries 13, 14 and 15 and by the use of this system as a whole as shown, a symmetrical continuous flow of current is secured in the three phase mains and further current flows simultaneously from three of the anodes at all times so that the use of the anodes and the secondaries 10, 11 and 12 is much less intermittent and therefore much more advantageous than under the condition in which the inductances 17, 18 and 19 are not used. These advantages may be of great importance in some developments as, for example, where a railroad is operated by means of vapor rectifiers so that the predominant part of the load on the power house is of this character.

In Fig. 2 I show a system having similar characteristics but instead of obtaining the neutral points of the transformer secondaries 10, 11 and 12 directly I accomplish the same result by connecting two inductances in series across the transformer secondaries and using the common points of the pairs of inductances, which are numbered 22, 23, 24, 25, 26 and 27 respectively. In general the system of Fig. 2 is similar to the system of Fig. 1 and its operation will be understood without further explanation.

In Fig. 3 I show a system somewhat similar to Fig. 2, but the inductances 28, 29, 30, 31, 32 and 33 for obtaining the middle point of the system are differently grouped, that is the inductances 28, 30 and 32 connected to the left hand terminals of the transformer secondaries 10, 11 and 12 are connected to a common load 35, which may be a motor, by their lead 34 and to the return conductor 36, while the three inductances 29, 31 and 33 are connected through the common conductor 37, and the motor or other translating device, 38, to the return conductor, 36, leading through the inductance 20 to the main cathode, 8, to the work circuit, 9. In this system I utilize two translating devices, 35 and 38, such as two motors, mechanically linked together, each operating upon one train of waves. In this system I obtain the advantage of the normal supply of single phase currents in the primary windings which may, if desired, be connected in delta as shown in Figs. 1 and 2, or in star.

In Fig. 4, I show a system somewhat similar to the earlier figures, but provided with a keeping alive circuit, 39, including a supplemental electrode, 40, and the battery, 41. This feature will be understood from the present knowledge of the art. In this system I connect the primary windings 42, 43 and 44, which energize respectively the secondaries 10, 11 and 12 from the three phase supply mains 45ª, 45ᵇ, 45ᶜ, by a star connection; otherwise the system of Fig. 4 is similar to that of the earlier figures. In operation, however, it is somewhat different in view of the star connected primary windings 42, 43 and 44. In the systems as shown in Fig. 4 there are six impulses from the three secondary windings 10, 11 and 12, that is during some period of the cycle the tendency for current to flow from an anode to the cathode 8 will be greatest on each individual of the six anodes. When, however, current flows from such an anode, for example, as from the anode 2, this requires a flow of current in the corresponding section of its secondary winding, in this case the left hand half of the secondary, 10; this requires current in the primary, 42. But current cannot flow in the primary, 42, without flowing through the primary, 43, or the primary, 44, therefore, whichever of the secondary windings 11 and 12 corresponding thereto has the higher voltage will have its voltage sufficiently raised to cause current to flow from the corresponding anode,—in the case assumed from the anode, 5, connected to the right hand end of the secondary, 11, assuming this winding to be the next in rotation. Since the current in the primary, 42, naturally flows backward in the primary, 43, the electromotive force in the secondary winding, 11, therefore, will tend to be in the opposite direction and the right hand anode instead of the left hand anode connected therewith will be impressed with the positive potential. If the winding, 43, happens, as just assumed, to be the next in rotation after 42, the flow of current will be shifted from the anode, 5, to the anode, 6, as the next step, thus relieving the anode, 5, and so on, the net result being the simultaneous operation of at least two of the anodes and of the connections of the transformer secondaries connected therewith. This again gives relative continuity of service compared with the operation which would exist where, for example, the common point of the primaries 42, 43 and 44 is grounded and a similar ground provided in the generator or where this point is supplied by a fourth neutral line wire. For example, in the system as shown impulses are transmitted in the line wires 45ª, 45ᵇ, 45ᶜ at the voltage between line wires, while if the fourth conductor above referred to were used the transmission would be at approximately 6/10 of this line voltage, this 6/10 voltage being the voltage between one line wire and ground which would give a relatively inefficient operation.

In Fig. 5 I have shown in place of three single phase transformers a three phase transformer with three secondaries, 110, 111 and 112, and three primaries, 142, 143 and 144. The core is shown at 46. The middle points of the secondary windings 110, 111 and 112 are connected to a common conductor, 47, which leads through the work circuit, 9, the inductance coil, 20, to the anode 8. The terminals of the transformer secondaries 110, 111 and 112 are connected to the anodes 2, 3, 4, 5, 6 and 7; the primaries 142, 143 and 144 are star connected, the mains being shown at 48ª, 48ᵇ, 48ᶜ. In general this system resembles that of Fig. 4, except for the use of the three phase transformer. In operation the same advantages of relative continuity are obtained and in addition the linking together of the sets of windings on a single core interrelates these windings in such a way as to increase the relative continuity of the currents in the supply.

In Fig. 6 I show three single phase transformer secondaries 10, 11 and 12 connected to the anodes 2, 3, 4, 5, 6 and 7 of the vapor rectifier 1 and also at their middle points by the conductor, 36, through the work circuit, 9, and the coil, 20, to the cathode, 8. In the leads between the transformer secondaries and the rectifier I insert a balancing device, 49, consisting of the core, 50, and six windings 51, 52, 53, 54, 55 and 56. These coils are located one in each of the six leads from the transformer secondaries 10, 11 and 12. The two coils shown at 52, located in the leads of the transformer secondary, 10, are located on one leg, 57, to the core, 50. The coils 52 and 54 in the leads of the transformer secondary, 11 are located on the leg, 58, of the coil, 50, while the coils 55 and 56 in the leads of the transformer secondary, 12, are located in the leg 59. I sometimes add supplemental magnetic leakage gaps 60 and 61 between the main legs of the core to increase the inductance of the several pairs of coils. The operation of this figure may be described as follows: Without the balance device, 49, six current impulses in the cycle would flow in appropriate order from the six anodes to the cathode, each half of a transformer secondary supplying one impulse. This calls for a relatively infrequent or discontinuous use of the primary windings and anodes as well as primary windings which have already been described as disadvantageous. Then, in the use of the balance device, 49, however, we have a current impulse flowing from the transformer secondary, 10, to the coil, 51, a counter acting electromotive force is set up by the electrical core, 57, which tends to cause a similar electromotive force in the coils located on the legs 58 and 59 but in the opposite direction. However, since the pairs of coils 51 and 52; 53 and 54; and 55 and 56 are so wound that an electromotive force produced in the core of any pair tends to produce simultaneous electromotive forces to or from the container in both coils of the pair as the direction may happen to be, and since what would be a counter electromotive force in the leg 57 will be a favorable electromotive force in the legs 58 and 59, the result of the current impulse, 51, will be to produce electromotive forces in the coils 53 and 54 toward the anodes 4 and 5. One of these favorable impulses combined with the favorably directed electromotive force in the secondary 11 will cause current to flow in the corresponding anode 4 or 5. Similarly with the coils 55 and 56 on the leg 59. If the balance device, 49, is so proportioned that the magnetizing power of the impulse, 51, bears somewhat the same relation to the reluctance of the core, 50, as the work current in the primary of the transformer bears to the reluctance of the core of the latter, the impulse in the coil 51 will produce a sufficiently powerful electromotive force in the coils 53, 54, and 55, 56 to initiate current flow in one or the other of the coils of each pair. As the highest electromotive force naturally passes from the circuit of the coil, 51, to the next circuit, for example, the circuit of the coil 54 the same sort of thing is repeated so that current flow in the core 54 causes current flow in two other coils. This arrangement thus gives a relatively very steady and continuous use of the anodes and transformer windings and causes relatively normal flow of current in the primary windings.

To proportion the flow of current in the several windings more or less in proportion to the momentary voltages therein I may, if desired, make the legs 57, 58 and 59 of relatively small cross section as shown in the drawing. This has the effect of producing partial saturation and tending to reduce the assisting electromotive force in the other legs. I may also supply leakage paths, 60 and 61, between the legs which would serve somewhat the same purpose for part of the magnetism produced by the coil acting as the exciting coil will be shunted away from the other active legs.

The description of my invention has been made more particular with respect to the various figures of the drawings, but I wish it understood that I do not limit myself to these particular features, but consider other forms and arrangements producing the same results as falling within its scope. For example, other dispositions of the coil windings or equivalent devices may be substituted for those shown without changing the operation of the systems.

I further wish it understood that each of the several features shown in connection with any particular one of the systems may be and is intended to be applicable to the other systems when desired unless some obvious disability exists.

I claim as my invention:

1. In a system of electrical distribution, a vapor rectifier, a three-phase supply circuit, three single phase transformers connected in delta across the supply circuits and having their secondaries connected together at their middle points, connections from the terminals of the secondaries to separate anodes in said rectifier and a connection from the point of common connection of said secondaries to the cathode of the rectifier and inductance coils inserted in the connections between said middle points and said common point.

2. In a system of electrical distribution, the combination with a multi-phase rectifier, a work circuit therefor, a plurality of single-phase transformers connected to amodes in said rectifier, and means for maintaining a substantially continuous flow of current from each single-phase transformer, of a poly-phase supply for the said single-phase transformers, whereby relatively continuous currents flow in said supply circuit.

3. In a system of electrical distribution, the combination with a poly-phase rectifier, having a plurality of main anodes and a main cathode and separate supply points for said several anodes, of means for causing a simultaneous flow in said rectifier from a plurality of said anodes.

4. In a system of electrical distribution, the combination with a poly-phase vapor electric rectifier, of a plurality of single-phase supply windings therefor, and means for causing current flow from said single-phase supply windings to overlap in said rectifier.

5. In a system of electrical distribution, the combination with a poly-phase rectifier comprising an exhausted container, a plurality of main anodes in pairs, a main cathode therefor and a plurality of sources of supply of different phase for said anodes, of means for maintaining a flow of current from each pair of said anodes continuous independently of the current flowing from other anodes.

Signed at New York in the county of New York and State of New York this 1st day of February A. D. 1913.

PERCY H. THOMAS.

Witnesses:
WM. H. CAPEL,
THOS. H. BROWN.